(12) United States Patent
Hosch et al.

(10) Patent No.: US 11,603,269 B2
(45) Date of Patent: Mar. 14, 2023

(54) MOUNTING ASSEMBLY FOR GEARMOTOR OF A CONVEYOR ASSEMBLY

(71) Applicant: Dorner Mfg. Corp., Hartland, WI (US)

(72) Inventors: Michael A. Hosch, Oconomowoc, WI (US); Scott Grahl, West Bend, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 17/394,552

(22) Filed: Aug. 5, 2021

(65) Prior Publication Data

US 2023/0037999 A1    Feb. 9, 2023

(51) Int. Cl.
| B65G 23/08 | (2006.01) |
| B65G 23/24 | (2006.01) |
| B65G 23/22 | (2006.01) |

(52) U.S. Cl.
CPC ............. *B65G 23/08* (2013.01); *B65G 23/22* (2013.01); *B65G 23/24* (2013.01)

(58) Field of Classification Search
CPC ........ B65G 23/08; B65G 23/22; B65G 23/24; B65G 23/26; B65G 23/28; B65G 23/30
See application file for complete search history.

(56) References Cited

U.S. PATENT DOCUMENTS

| 4,708,238 A | 11/1987 | Bultman et al. | |
| 4,718,540 A * | 1/1988 | Greenwell | B65G 23/26 198/803.11 |
| 5,391,046 A | 2/1995 | Colamussi | |
| 5,873,139 A | 2/1999 | Goth | |
| 6,672,449 B2 * | 1/2004 | Nakamura | H02K 5/225 198/788 |
| 7,207,435 B2 * | 4/2007 | Bude | B65G 23/06 198/834 |
| 7,681,719 B2 * | 3/2010 | Hosch | B65G 47/66 198/841 |
| 7,726,467 B1 * | 6/2010 | Schoonover | F16D 1/101 198/833 |
| 7,882,945 B2 | 2/2011 | Willi et al. | |
| 8,381,901 B2 * | 2/2013 | Yamamoto | B65G 23/08 198/791 |
| 9,248,981 B1 | 2/2016 | Skoretz et al. | |
| 10,926,959 B2 * | 2/2021 | Lindemann | B65G 23/08 |

(Continued)

OTHER PUBLICATIONS

BoWex Operating/Assembly Instructions. KTR Group. 22 Pages. Dated Jul. 23, 2019.

*Primary Examiner* — Mark A Deuble
(74) *Attorney, Agent, or Firm* — Andrus Intellectual Property Law, LLP (57) ABSTRACT

A quick release mounting assembly for an endless belt conveyor that allows a drive motor to be connected to a drive roller of the conveyor. The quick release mounting assembly includes a drive roller hub connected to the shaft of the drive roller. A drive motor hub is connected to the drive shaft of the drive motor. Both the drive roller hub and the drive motor hub include an external series of external splines. The mounting assembly includes a drive coupling having a first receiving area that engages the drive motor hub and a second receiving area that engages the drive roller hub such that the drive coupling transfers rotation of the drive shaft to the drive roller. The drive coupling is received within a housing that is removably mounted to a gearbox of the drive motor.

15 Claims, 6 Drawing Sheets

(56) References Cited

U.S. PATENT DOCUMENTS

| | | | |
|---|---|---|---|
| 11,136,194 B2 * | 10/2021 | K. S .................. | B65G 13/04 |
| 2011/0152021 A1 | 6/2011 | Johannsen et al. | |
| 2018/0055085 A1 | 3/2018 | Reeser et al. | |

* cited by examiner

MOUNTING ASSEMBLY FOR GEARMOTOR OF A CONVEYOR ASSEMBLY

BACKGROUND

The present disclosure generally relates to a mounting assembly for both mounting and coupling a drive motor to a drive roller of an endless belt conveyor. More specifically, the present disclosure relates to a mounting assembly that allows the drive motor to be quickly and easily connected and disconnected from the drive roller for cleaning with minimal tooling required.

Presently, in food processing conveyor applications, conveyors must be manufactured such that the conveyor can be disassembled, the conveyor belt removed and the entire conveyor frame assembly sanitized. Following sanitation, the conveyor belt must be reinstalled for continued operation. Numerous guidelines exist to regulate the type of conveyor assembly that be used in a sanitary environment, such as in a food processing facility. Typically, these guidelines require that the conveyor frame assembly must be capable of being disassembled and sanitized on a regular, scheduled basis. Since the conveyor frame assembly must be sanitized regularly, the conveyor assembly must be capable of being quickly disassembled to allow complete cleaning. Preferably, the disassembly should require few to no tools.

Presently, as part of the cleaning process, the complexity of the mounting between the gear box of a gearmotor and the drive roller results in the gearmotor remaining mounted to the conveyor frame during cleaning. Since cleaning involves the use cleaning solutions, the cleaning solutions attack the components of the gear box and gearmotor, thus reducing the life of these components. Further, cleaning with the gearmotor and gear box attached to the conveyor frame is not as effective as when the drive mechanism is fully removed and disassembled.

The inventor has recognized this drawback and has developed the mounting assembly of the present disclosure that allows the drive mechanism to be removed from the conveyor frame for cleaning. The mounting assembly allows the reconnection of the drive mechanism to the drive roller after cleaning with minimal tooling required.

SUMMARY

The present disclosure relates to a mounting assembly for use between a drive motor and a drive roller of a conveyor assembly. The mounting assembly allows for the quick connection and disconnection of the drive shaft of the drive motor and the drive roller of the conveyor, especially for cleaning.

A drive assembly is disclosed for use with a conveyor having a conveyor belts entrained between a drive roller and an end roller that are mounted to opposite ends of a conveyor frame. The drive assembly includes a drive motor having a drive shaft. The drive motor can be a gear motor including a gear box and the drive shaft. The drive assembly includes a drive motor hub that is mounted to the drive shaft for rotational movement with the drive shaft. The drive motor hub is designed to include a plurality of external splines that are spaced from each other.

The drive assembly further includes a drive roller hub that is mounted to the drive roller of the conveyor assembly. The drive roller hub is mounted for rotational movement with the drive roller. The drive roller hub is designed to include a plurality of external splines that are spaced from each other.

The drive assembly further includes a drive coupling that is designed to engage both the drive motor hub and the drive roller hub to transfer rotation between the two hubs. The drive coupling includes a first receiving area that engages the splines on the drive motor hub and a second receiving area that engages the splines on the drive roller hub. The drive coupling includes a series of grooves in each of the receiving areas that mate with the splines to provide a secure connection during rotation of the drive shaft.

In one exemplary embodiment, a housing is provided as part of the drive assembly. The housing is designed to receive the drive coupling and the drive roller hub and is removably connected to the drive motor. In an embodiment in which the drive motor includes a gear box, the housing is designed to be removably connected to the gear box. In one contemplated embodiment, rotation of the gear box relative to the housing allows the gear box to be disconnected from the housing while rotation in an opposite direction secures the gear box to the housing.

The present disclosure further relates to a mounting assembly for connecting a drive shaft of a motor to a drive roller of a conveyor that includes a conveyor belt entrained between the drive roller and an end roller mounted to the conveyor frame. The mounting assembly includes a drive motor hub that is mounted to the drive shaft for rotational movement with the drive shaft. The drive motor hub is designed to include a plurality of external splines that are spaced from each other.

The mounting assembly further includes a drive roller hub that is mounted to the drive roller of the conveyor assembly. The drive roller hub is mounted for rotational movement with the drive roller. The drive roller hub is designed to include a plurality of external splines that are spaced from each other.

The mounting assembly further includes a drive coupling that is designed to engage both the drive motor hub and the drive roller hub to transfer rotation between the two hubs. The drive coupling includes a first receiving area that engages the splines on the drive motor hub and a second receiving area that engages the splines on the drive roller hub. The drive coupling includes a series of grooves in each of the receiving areas that mate with the splines to provide a secure connection during rotation of the drive shaft.

In one exemplary embodiment, a housing is provided as part of the mounting assembly. The housing is designed to receive the drive coupling and the drive roller hub and is removably connected to the drive motor. In an embodiment in which the drive motor includes a gear box, the housing is designed to be removably connected to the gear box. In one contemplated embodiment, rotation of the gear box relative to the housing allows the gear box to be disconnected from the housing while rotation in an opposite direction secures the housing to the gear box.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
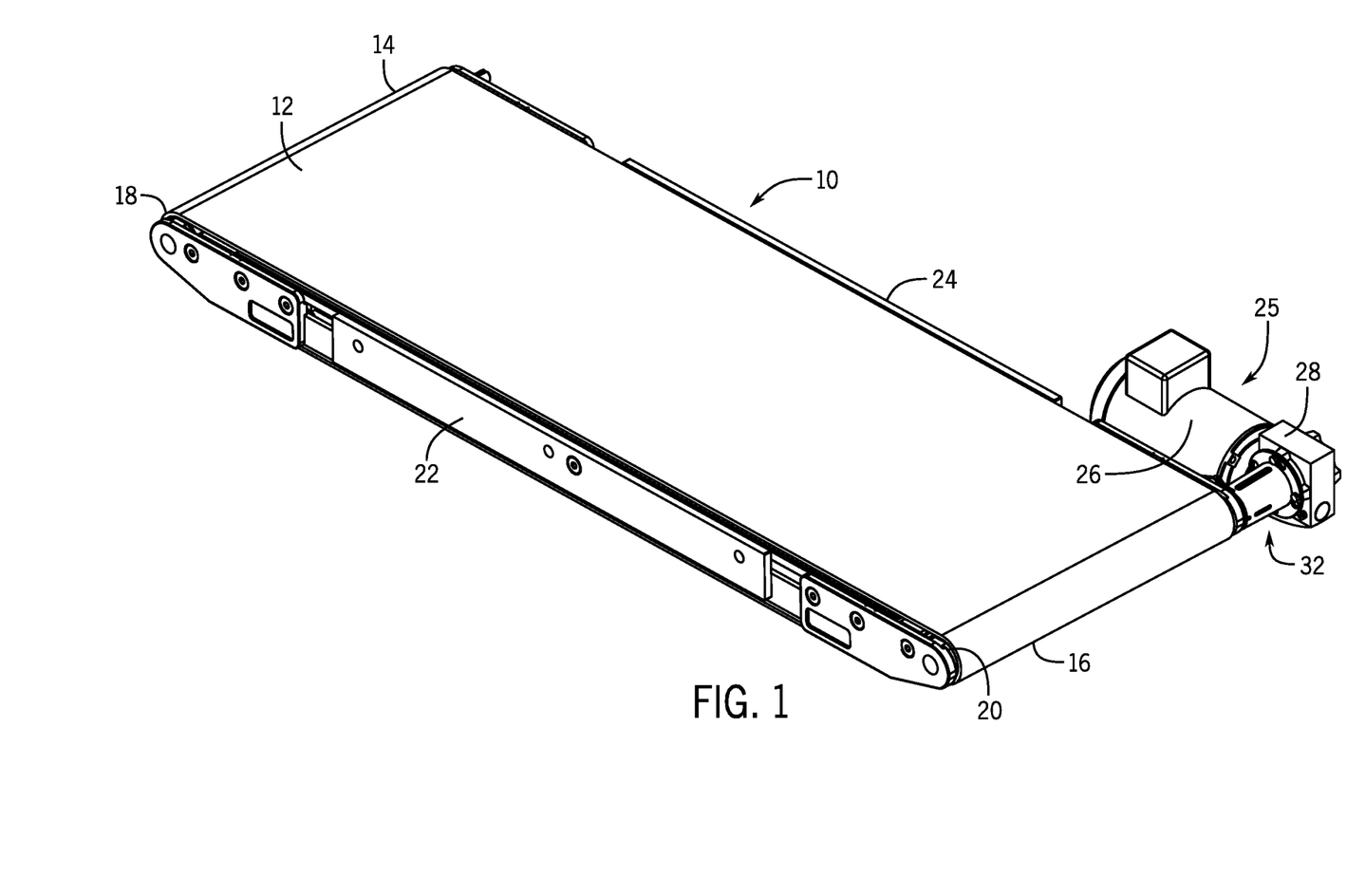
FIG. 1 is a perspective view of an endless belt conveyor including the mounting assembly of the present disclosure.
Figure 2:
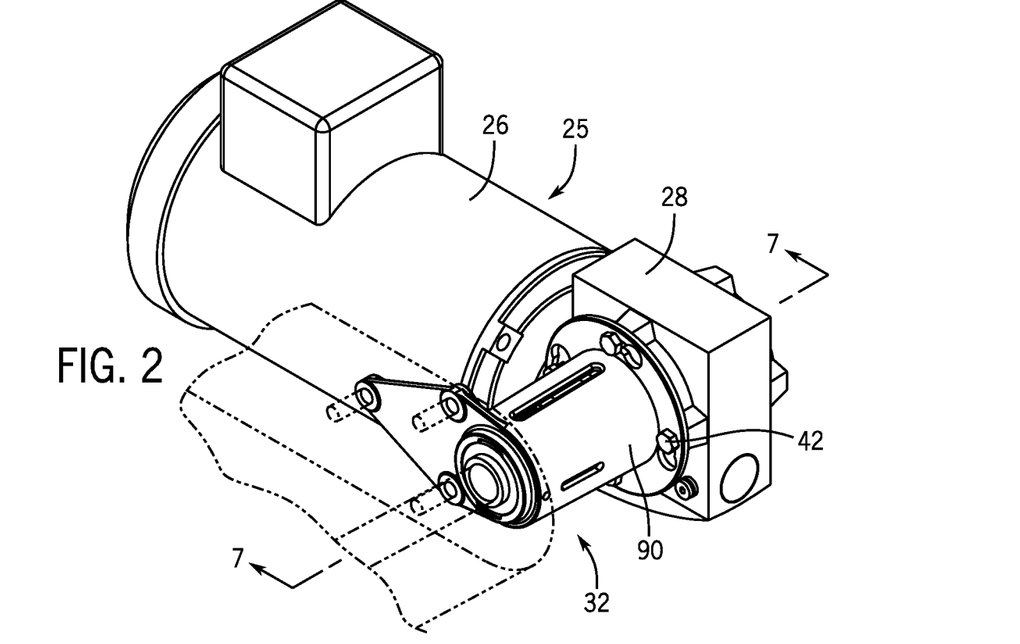
FIG. 2 is a magnified perspective view of the mounting assembly in the locked condition.

FIG. 1 illustrates a conveyor 10 including an endless conveyor belt 12 that is operable to move products or items positioned on the conveyor belt 12 between a first end 14 and a second end 16. In the embodiment illustrated in FIG. 1, the conveyor is a sanitary conveyor that is designed for use in the food processing industry, although other types of conveyors and uses are contemplated as being within the scope of the present disclosure.

The first end 14 of the conveyor 10 includes an end roller 18 while the second end 16 includes a drive roller 20. The end roller 18 and the drive roller 20 are supported between a pair of spaced side frame members 22 and 24. The side frame members 22 and 24 define the width of the of the conveyor 10 and provide support for components that may be used during operation of the conveyor 10, such as sensors and detectors. The side frame members are joined by cross supports located below the conveyor belt 12 such that the combination of the side frame members and the cross supports define the conveyor frame. In many embodiments, the conveyor frame is mounted above the floor or other work surface by a stand or support legs (not shown).

In the embodiment shown in FIG. 1, a gear motor 25 is positioned adjacent to the conveyor 10 and provides the driving force to rotate the drive roller 20. In the embodiment illustrated, the gear motor 25 includes an electric drive motor 26 coupled to a gear box 28. The electric drive motor 26 is controlled by a controller such that the electric drive motor 26 can operate in both a first and a second direction. Operation of the electric drive motor 26 thus controls the movement of the conveyor belt 12 and the articles supported on the conveyor belt. The electric drive motor 26 could be supported on the side frame member 26 or could be supported by a separate support leg depending on the configuration of the conveyor 10.

In the embodiment shown in FIG. 1, the electric drive motor 26 is connected to a gear box 28 to form the gear motor 25. The gear motor 25 is a conventional component that converts the rotational movement of a motor drive shaft of the electric drive motor 26 to rotational movement of a drive shaft that extends from the gear box 28 in a direction perpendicular to the shaft of the electric drive motor 26. Typically, the gear box 28 is mounted to the electric drive motor 26 and thus forms an integrated gear motor 25.

Figures 4, 5:
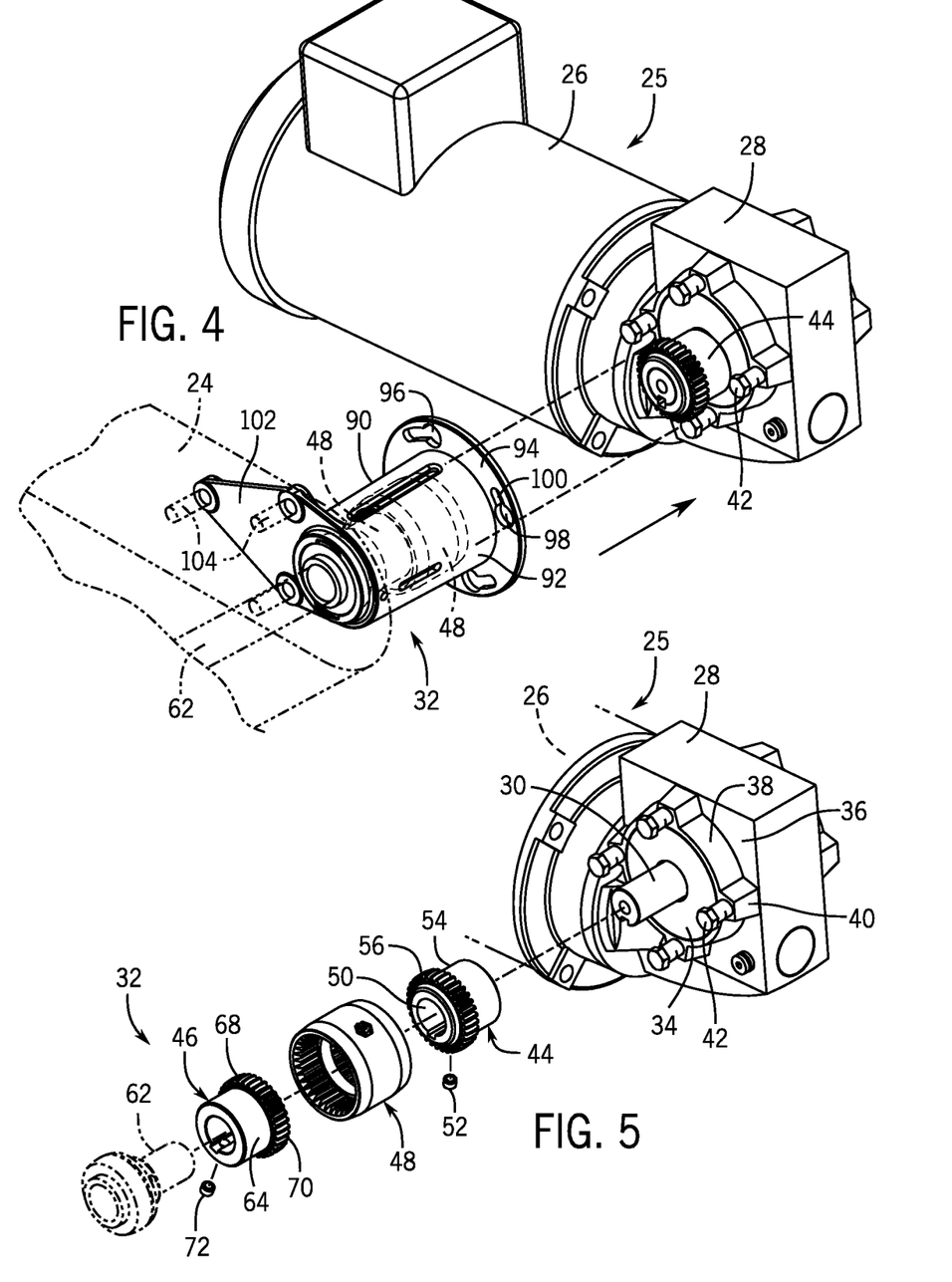
FIG. 4 is a magnified perspective view of the detachment of the drive motor from the mounting assembly and endless belt conveyor.
FIG. 5 is an exploded view of the mounting assembly of the present disclosure.

As best shown in FIG. 5, the gear box 28 includes a drive shaft 30 that extends from the gear box 28 and provides the primary motive force for rotating the drive roller. In the embodiment shown in FIG. 1, a quick release mounting assembly 32 is positioned between the gear box 28 coupled to the electric drive motor 26 and the drive roller 20 of the conveyor 10. The mounting assembly 32 allows for simple and quick connection and disconnection between the gear motor 25 and the drive roller 20 of the conveyor 10. Such mounting assembly allows for quicker and more effective cleaning of the entire conveyor 10 in a manner as will be described in greater detail below.

FIGS. 2-5 illustrate the quick release mounting assembly 32 of the present disclosure in various states of connection and disconnection between the drive roller of the conveyor and the gear motor 25. Referring first to FIG. 5, the gear motor 25 includes the gear box 28 attached near one end. The gear box 28 is connected to the electric drive motor 26 and includes the drive shaft 30. The drive shaft 30 extends from a mounting surface 34 which in turn is offset from the front face 36 of the gear box 28 by a shoulder 38. The shoulder 38 further defines four spaced mounting tabs 40 that each receive one of four gear head bolts 42. The gear head bolts 42 each include a threaded shaft and a head such that the gear head bolts 42 can be rotated in each direction to move the gear head bolts 42 relative to the respective mounting tab 40.

FIG. 5 further illustrates components of the quick release mounting assembly 32 of the present disclosure. Specifically, the quick release mounting assembly 32 includes a drive motor hub 44, a drive roller hub 46 and a drive coupling 48. The drive coupling 48 is designed to receive both the drive motor hub 44 and the drive roller hub 46 as will be described in greater detail below.

Figure 6:
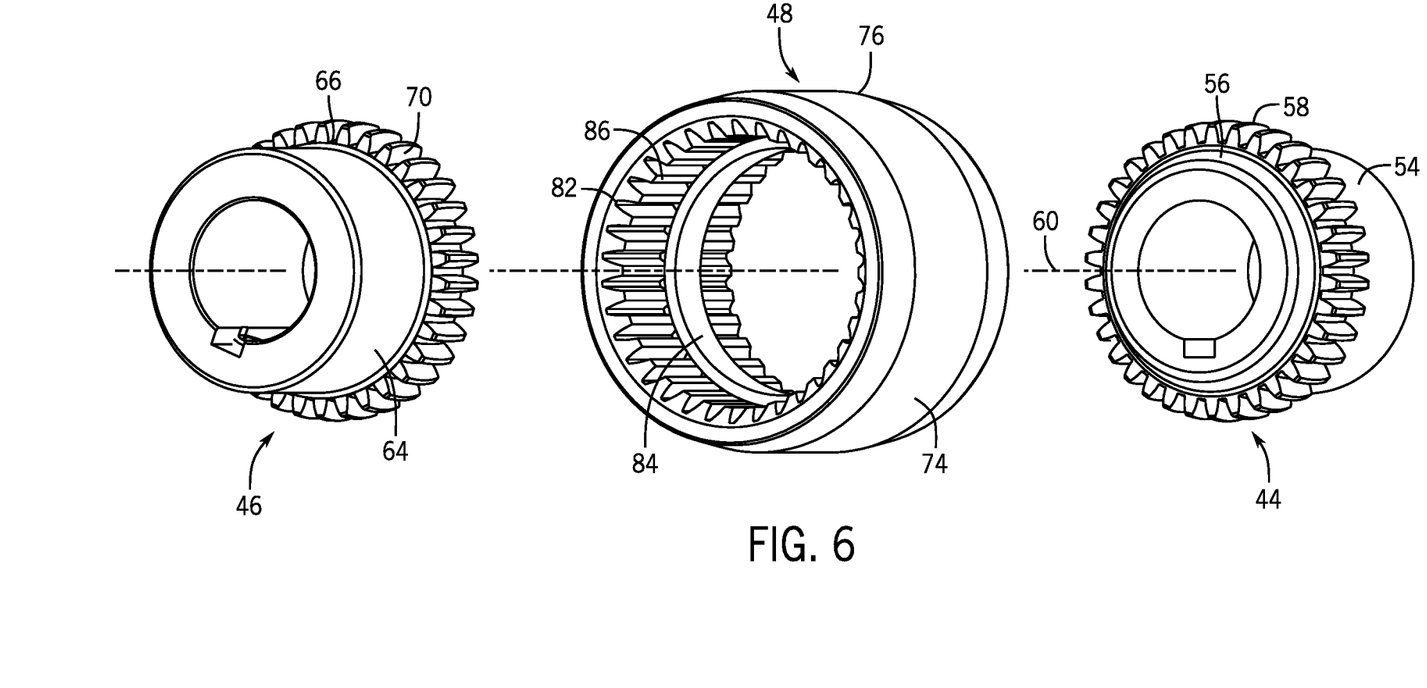
FIG. 6 is a magnified, exploded view of a portion of the mounting assembly.

The drive motor hub 44 is designed to be received on the drive shaft 30 of the gear motor 25. The drive motor hub 44 includes an open interior 50 having an inner circumference that closely corresponds to the outer circumference of the drive shaft 30. The drive motor hub 44 can be slid into position along the drive shaft 30 as is shown in FIG. 4. As shown in FIG. 5, a locking screw 52 extends into the body portion 54 to hold the drive motor hub 44 on the drive shaft 30 and to prevent relative rotation between the drive shaft 30 and the drive motor hub 44. The drive motor hub 44 includes an engagement portion 56 that includes a series of spaced, external splines 58, which are best shown in FIG. 6. As illustrated in FIG. 6, the splines 58 are equally spaced from each other around the outer circumference of the engagement portion 56. The splines 58 each extend radially further away from the center axis 60 than the body portion 54.

Referring back to FIG. 5, the drive roller hub 46 has a similar configuration to the drive motor hub 44 and is designed to be received on the drive roller shaft 62. The drive roller hub 46 includes a similar body portion 64 and an engagement portion 68 that includes a series of space splines 70. The drive roller hub 46 includes an inner circumference that closely corresponds to the outer circumference of the drive roller shaft 62. The drive roller hub is secured to the drive roller shaft 62 through a similar locking screw 72. In this manner, the drive roller hub 46 is locked into place on the drive roller shaft 62 and thus rotates with the drive roller shaft 62.

FIG. 6 further shows the details of the drive roller hub 46. As can be seen in FIG. 6, the drive roller hub 46 and the drive motor hub 44 have generally a similar configuration. The series of splines 70 are spaced evenly around the outer circumference of the drive roller hub 46 and extend radially further from the center axis than the outer surface of the body portion 68.

As shown in FIGS. 5 and 6, the quick release mounting assembly 32 further includes a drive coupling 48 that joins the drive motor hub 44 and the drive roller hub 46 such that rotation of the drive motor hub 44 results in corresponding rotation of the drive roller hub 46. The drive coupling 48 is a generally annular component defined by a main body 74 having a generally smooth outer surface 76. The main body 74 defines an annular opening that extends along the center axis 60.

Figure 8:
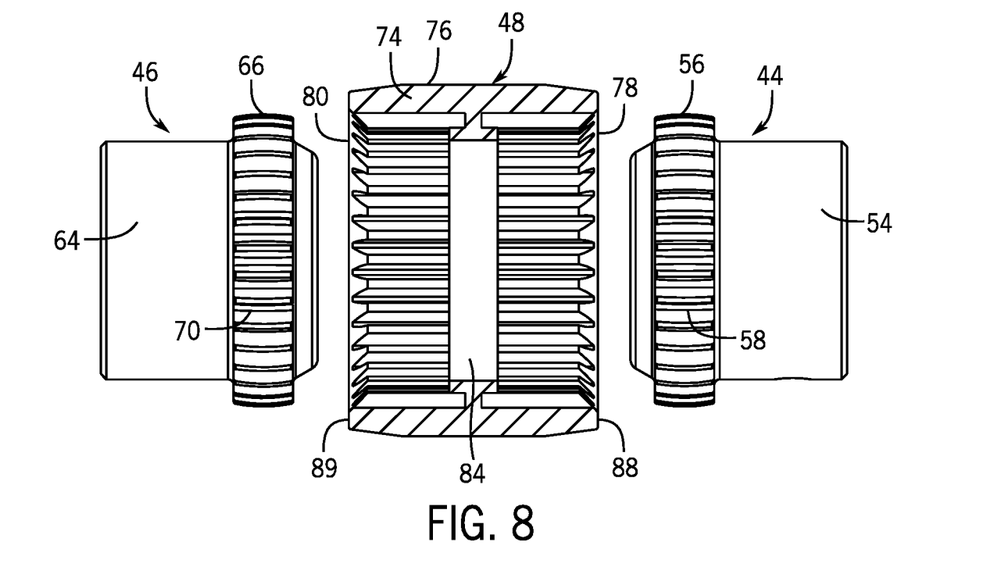
FIG. 8 is a partial section view of the drive coupling and both the drive roller hub and the drive motor hub.

As can best be seen in FIGS. 6 and 8, the drive coupling 48 defines a first receiving area 78 and a second receiving area 80 that each include a series of internal receiving grooves 82. The internal receiving grooves 82 are each designed to receive either one of the splines 58 on the drive motor hub 44 or one of the splines 70 on the drive roller hub. The receiving grooves 82 each have the same depth and spacing as the splines 58 or 70. As shown in FIGS. 6 and 8, a center wall 84 is located between the first receiving area 78 and the second receiving area 80. The center wall 84 extends further radially inward as compared to the inner ends 86 positioned between each of the receiving grooves 82. The center wall 84 thus provides a stop surface for limiting the amount of insertion of the drive motor hub 44 and the drive roller hub 46.

As can be understood in FIG. 8, the first receiving area 78 extends inward from a first end 88 of the drive coupling 48 while the second receiving area 80 extends inwardly from the second end 89 of the drive coupling 48. It is contemplated that the first and second receiving areas 78 and 80 could be identical such that the orientation of the drive coupling 48 could be reversed and still function in the manner described.

Referring back to FIGS. 2-5, the assembly of the gear motor 25 to the drive roller of the conveyor utilizing the quick release mounting assembly 32 will be further described. Referring first to FIG. 4, the drive coupling 48 and the drive roller hub 46 are shown mounted within a housing 90. The housing 90 includes a cylindrical main body portion 92 and a mounting flange 94. The mounting flange 94 extends perpendicular to the main body portion 92 and includes a series of attachment slots 96. Each of the attachment slots 96 is formed as a keyhole slot that includes an expanded access portion 98 and a locking slot 100. The access portion 98 is designed to be slightly larger than the head on each of the gear head bolts 42 such that the head of each of the gear head bolts 42 can pass through the access portion 98. The locking slot 100 is designed to be slightly smaller than the head on the gear head bolts 42 to prevent the locking slot 100 from passing over the head of the gear head bolt 42. In the embodiment illustrated, the locking slot 100 extends in a counterclockwise direction from the access portion 98, which is desired when the drive motor 26 extends to the left of the gear box 28 as shown. However, if the orientation of the drive motor 26 is to the right of the gear box 28, a housing 90 with the attachment slots 96 reversed would be utilized. The orientation of the attachment slots 96 is selected such that the weight of the drive motor 26 will lock the drive motor 26 in place relative to the housing 90.

The end of the housing 90 opposite the mounting flange 94 includes a mounting bracket 102 that can be securely attached to the side frame member 24 through a series of bolts 104. In this manner, the housing 90, and thus the internally located drive roller hub 46 and drive coupling 48, can be supported on the end of the conveyor frame as illustrated in FIG. 4. In this position, the drive roller shaft 62 is coupled to the drive coupling 48.

Figure 3:
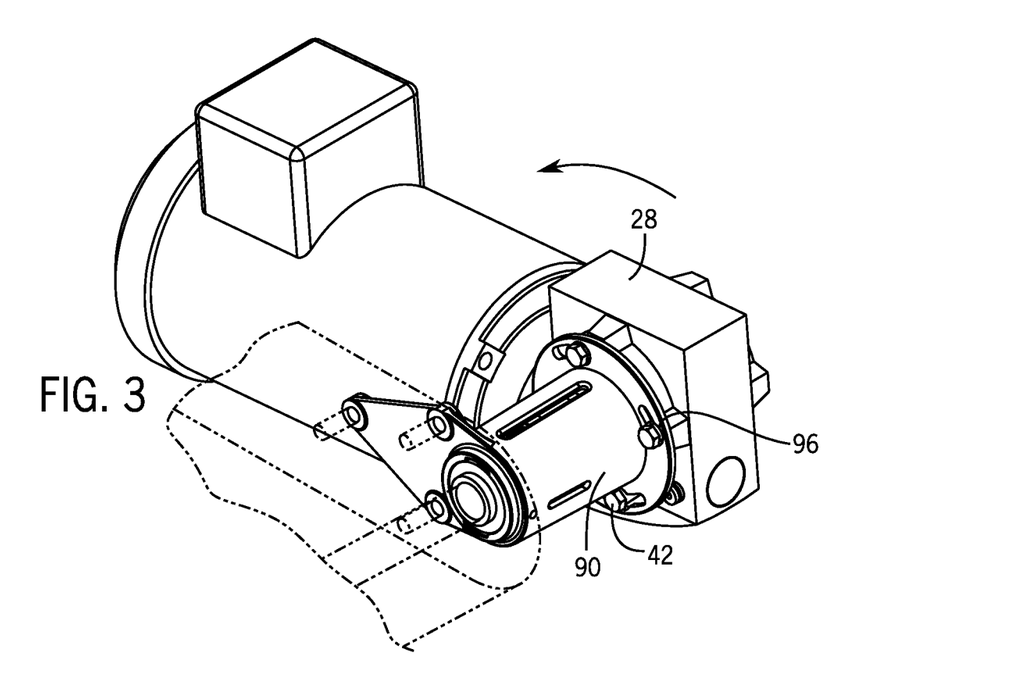
FIG. 3 is a magnified perspective view of the mounting assembly in the rotated, release condition.

Referring now to FIG. 3, the housing 90 can be moved toward the gear box 28 until the head of each of the gear head bolts 42 passes through the access portion 98 of one of the attachment slots 96. Once in this position, the drive motor 26 and the gear box 28 can be rotated under the influence of gravity in a counterclockwise direction until the gear head bolts 42 enter into the locking slot 100 of each of the attachment slots 96. The weight of the drive motor 26 and the gear box 28 hold the gear head bolts 42 in this position due to gravity. Once in this position, the gear head bolts 42 can be tightened to lock the housing 90 and gear box 28 in the position shown in FIG. 2. Since the housing 90 is securely mounted to the side frame member 24, the housing 90 is able to support the weight of the gear motor 25 on the side frame members 24 of the conveyor frame. In the condition shown in FIG. 2, the drive motor hub 44 is received within the drive coupling 48.

Figure 7:
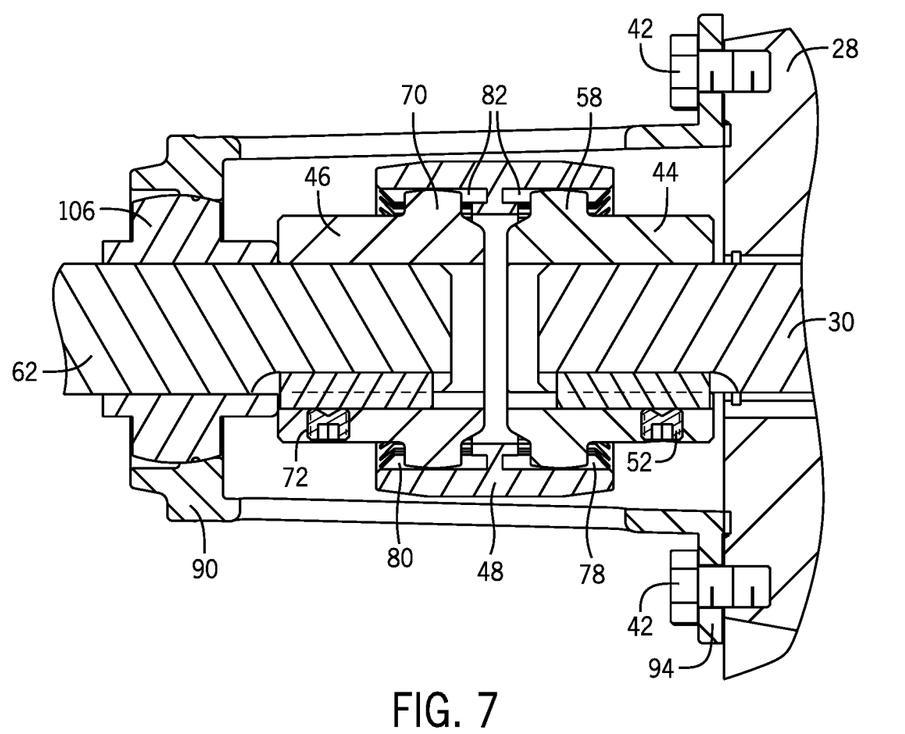
FIG. 7 is a section view taken along line 7-7 of FIG. 2.

FIG. 7 illustrates the driving connection between the drive roller shaft 62 and the drive motor shaft 30. As illustrated, the drive motor hub 44 is positioned along the outer surface of the drive shaft 30 and held in place by the locking screw 52. The series of external splines 58 are received within a series of corresponding grooves 82 formed in the first receiving area 78 of the drive coupling 48. The drive roller hub 46 is likewise mounted to the outer surface of the drive roller shaft 62 and is held in place by the locking screw 72. The external splines 70 are received within corresponding receiving grooves 82 formed in the second receiving area 80.

As illustrated in FIG. 7, the housing 90 is attached to the gear box 28 through the series of gear head bolts 42 that each extend through the mounting flange 94. The opposite end of the housing 90 receives a bearing 106 also mounted to the external surface of the drive roller shaft 62. The bearing 106 allows the drive roller shaft 62 to rotate relative to the stationary housing 90.

Referring back to FIGS. 2 and 3, when a user or operator desires to remove the gear motor 25 from the conveyor, the plurality of gear head bolts 42 are loosened. Once the gear head bolts 42 are loosened, the gear motor 25 can be rotated relative to the housing 90 from the position shown in FIG. 2 to the position in FIG. 3. In the position shown in FIG. 3, the head of each gear head bolt 42 is aligned with the expanded access portion of the attachment slots. When in this position, the gear motor 20 can then be moved away from the housing 90 to the position shown in FIG. 4. In this manner, the quick release mounting assembly 32 can be used to quickly and easily connect the gear motor 24 to the conveyor frame.

Figure 9:
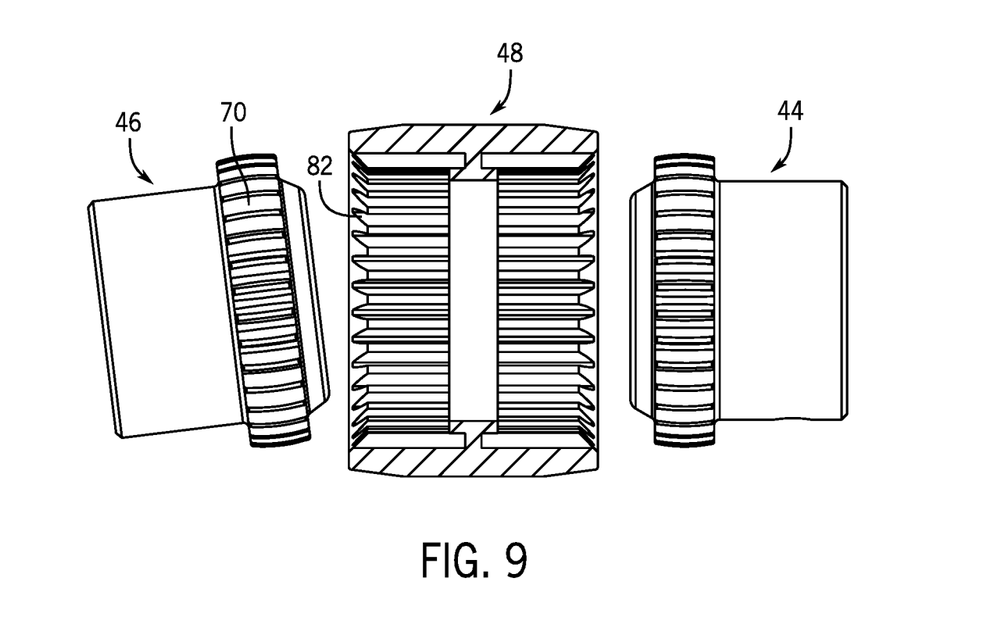
FIG. 9 is a partial section view similar to FIG. 8 showing the variable alignment before connection of the drive coupling.

Referring now to FIG. 9, the configuration of the drive coupling 48 and both the drive motor hub 44 and the drive roller hub 46 allow for the ease of connection between the components. In the embodiment shown in FIG. 9, the drive roller hub 46 is slightly askew relative to the center axis extending through the drive coupling 48 and the drive motor hub 44. However, the configuration of the external splines 70 and the internal receiving slots 82 allow the drive coupling 48 and the drive roller hub 46 to mate with each other. In this manner, the quick release mounting assembly of the present disclosure allows for quick and easy connection and disconnection between the gear motor and the drive roller of the conveyor.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A drive assembly for a conveyor having a conveyor belt entrained between a drive roller and an end roller mounted to a conveyor frame, the drive assembly comprising:
    a motor having a drive shaft;
    a drive motor hub mounted to the drive shaft, the drive motor hub including a plurality of splines;
    a drive roller hub mounted to the drive roller, the drive roller hub including a plurality of splines;
    a drive coupling including a first receiving area configured to engage the drive motor hub and a second receiving area configured to engage the drive roller hub such that the drive coupling transfers rotation of the drive shaft to the drive roller; and
    a housing that is removably connected to the motor, wherein the drive coupling is received within the housing.

2. The drive assembly of claim 1 wherein the drive motor hub and the drive roller hub each include a plurality of external splines and the first receiving area and the second receiving area of the drive coupling each include internal grooves.

3. The drive assembly of claim 1 wherein the housing is disconnected from the drive motor by rotating the drive motor relative to the housing.

4. The drive assembly of claim 3 wherein the drive motor includes a gear box having a plurality of bolts and the housing is connected to the gear box by the plurality of bolts.

5. The drive assembly of claim 4 wherein the housing includes an attachment flange having a plurality of attachment slots that each receive one of the plurality of bolts.

6. The drive assembly of claim 1 wherein the housing is securely connected to the conveyor frame.

7. A drive assembly for a conveyor having a conveyor belt entrained between a drive roller and an end roller mounted to a conveyor frame, the drive assembly comprising:
    a motor having a drive shaft;
    a drive motor hub mounted to the drive shaft, the drive motor hub including a plurality of splines;
    a drive roller hub mounted to the drive roller, the drive roller hub including a plurality of splines;
    a drive coupling including a first receiving area having a plurality of grooves each configured to receive one of the splines of the drive motor hub and a second receiving area having a plurality of grooves each configured to receives the splines of the drive roller hub; and
    a housing that surrounds the drive roller hub and the drive coupling in a mated condition, wherein the housing receives the drive motor hub and attaches to the motor such that the drive coupling transfers rotation of the drive shaft to the drive roller.

8. The drive assembly of claim 7 wherein the housing is disconnected from the motor by rotating the motor relative to the housing.

9. The drive assembly of claim 8 wherein the motor includes a gear box having a plurality of bolts and the housing is connected to the gear box by the plurality of bolts.

10. The drive assembly of claim 9 wherein the housing includes an attachment flange having a plurality of attachment slots that each receive one of the plurality of bolts.

11. A quick release mounting assembly for connecting a drive shaft of a motor to a drive roller of a conveyor having a conveyor belt entrained between the drive roller and an end roller mounted to a conveyor frame, the mounting assembly comprising:
    a drive motor hub configured to mount to the drive shaft, the drive motor hub including a plurality of splines;
    a drive roller hub configured to mount to the drive roller, the drive roller hub including a plurality of splines;
    a drive coupling including a first receiving area configured to engage the drive motor hub and a second receiving area configured to engage the drive roller hub such that the drive coupling transfers rotation of the drive shaft to the drive roller; and
    a housing that is removably connected to the motor, wherein the drive coupling is received within the housing and the housing is disconnected from the motor by rotating the motor relative to the housing.

12. The mounting assembly of claim 11 wherein the drive motor hub and the drive roller hub each include a plurality of external splines and the first receiving area and the second receiving area of the drive coupling each include internal grooves sized to receive the external splines.

13. The mounting assembly of claim 11 wherein the motor includes a gear box having a plurality of bolts and the housing is connected to the gear box by the plurality of bolts.

14. The mounting assembly of claim 13 wherein the housing includes an attachment flange having a plurality of attachment slots that each receive one of the plurality of bolts.

15. The mounting assembly of claim 11 wherein the housing is securely connected to the conveyor frame.

* * * * *